United States Patent Office 3,227,780
Patented Jan. 4, 1966

3,227,780
1,5,9-CYCLODODECATRIENE AND 1,2,4-TRI-VINYLCYCLOHEXANE AS CROSS-LINKING MONOMERS FOR UNSATURATED POLYESTER RESINS
Karl Brack, Wilmington, Del., assignor to Hercules Powder Company, Wilmington, Del., a corporation of Delaware
No Drawing. Filed May 7, 1963, Ser. No. 278,755
20 Claims. (Cl. 260—861)

This invention relates to cross linking unsaturated polyester resins with novel cross-linking agents and to new compositions of matter derived from mixtures of unsaturated polyester resins and said novel cross-linking agents.

At the present time styrene is used almost exclusively for cross-linking (curing) the commercially available unsaturated polyester resins in the preparation of insoluble, infusible coatings and resin bonded laminates. However, due to the fact that the boiling point of styrene (146° C.) is only a few degrees above the curing temperatures employed, losses of styrene are extensive, and a large excess of styrene must be used to insure sufficient cross-linking of the unsaturated polyester resin. It is obvious that such practice leaves much to be desired from an economical point of view.

Now in accordance with this invention it has been discovered that unsaturated polyesters can be cross-linked with a material selected from the group consisting of 1,5,9-cyclododecatriene, 1,2,4-trivinylcyclohexane, and mixtures thereof in any proportion to produce cured resin products which are insoluble in solvents which dissolve the uncross-linked unsaturated polyesters, and are infusible, and possess desirable physical properties. This is somewhat surprising since attempts to homopolymerize 1,5,9-cyclododecatriene and 1,2,4-trivinylcyclohexane have been unsuccessful.

As noted above, this invention is specific to the employment of a material of the group consisting of 1,5,9-cyclododecatriene, 1,2,4-trivinylcyclohexane, and mixtures thereof in any proportion as the cross-linking agents for unsaturated polyester resins.

The 1,5,9-cyclododecatriene also sometimes designated as cyclododecatriene-1,5,9, or as cyclododecatri-1,5,9-ene) is a commercial product, having a boiling point of 230° C. at atmospheric pressure. It can be prepared, for example, in accordance with U.S. Patent 2,964,574 by contacting butadiene at temperatures up to about 150° C., preferably about 40° C., with a catalyst formed from titanium tetrachloride and diethylaluminum chloride, in a hydrocarbon solvent, the molar ratio of titanium to aluminum being between about 1:3.5 to 1:5.

The 1,2,4-trivinylcyclohexane, having a boiling point of 200° C. at atmospheric pressure, is isomeric with 1,5,9-cyclododecatriene and is readily prepared therefrom, for example, in accordance with U.S. Patent 2,967,895 by conducting 1,5,9-cyclododecatriene in the vapor phase over palladium catalysts at temperatures between 400 and 600° C. for residence times in contact with the catalyst between 0.1 and 100 seconds, and working up the reaction product by distillation under reduced pressure.

Since, 1,5,9-cyclododecatriene and 1,2,4-trivinylcyclohexane each has the same molecular weight of 162, and each contains three double bonds, it is evident, therefore, that the equivalent combining weight per double bond for cross-linking purposes for each of these materials is 54. By comparison, the equivalent combining weight per double bond for cross-linking purposes for styrene is 104. It is apparent, therefore, that the triene cross-linking agents of this invention have distinct advantages over styrene as a cross-linking agent for unsaturated polyester resins. On a combining weight basis, only about half as much of the triene cross-linking agent is required to cross-link each polymerizably reactive α,β-enal group in the unsaturated polyester resin molecule as is required for styrene on the same basis. Moreover, since the boiling points of the specific triene cross-linking agents of this invention are 200° C. and 230° C., respectively, for 1,2,4-trivinylcyclohexane and 1,5,9-cyclododecatriene, in comparison to 146° C. for styrene, and thus substantially above customary curing temperatures, there is at most only a negligible amount of volatilization of the cross-linking agent during the curing. Accordingly, it is not necessary to employ any substantial excess of the triene cross-linking agent over theoretical combining weight requirements, as is necessary with styrene.

The amount of the triene cross-linking agent used can be varied over a rather wide range depending somewhat on the particular unsaturated polyester resin to be cross-linked, as well as on the physical properties desired in the final cured resin product, and the ultimate application of the cured resin product. In general, however, the amount of triene cross-linking agent employed will be within the range of from about 5% to about 50% by weight of the unsaturated polyester resin, and preferably between about 10% and about 20% by weight.

The unsaturated polyester resins employed in this invention are well known in the art and can be prepared by any of the known procedures. Many of these unsaturated polyesters are commercial products known under a variety of trade names. Basically, they are unsaturated alkyd resins prepared from the esterification of α,β-ethylenically unsaturated dicarboxylic acids with dihydroxy alcohols, dihydroxy phenols, or hydroxyalkylated derivatives of dihydroxy phenols. Usually, but not necessarily, part of the acidic reactant in preparing these esters may be a dicarboxylic acid free of nonbenzenoid unsaturation. Accordingly, therefore, these resins are essentially unsaturated linear polyesters containing a plurality of polymerizably reactive α,β-enal groups, i.e.

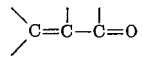

in each polymeric ester molecule, and any unsaturated polyester having at least two such polymerizably reactive α,β-enal groups in the polymeric ester molecule can be cross-linked in accordance with this invention.

An essential reactant in the formation of the essentially linear unsaturated polyesters of this invention, therefore, is an α,β-ethylenically unsaturated dicarboxylic acid. The anhydrides of such acids, when they exist, are fully equivalent to the free acid for the purposes of this invention. Suitable, α,β-ethylenically unsaturated dicarboxylic acids, and anhydrides, include, by way of example but not in limitation of the invention, maleic acid, maleic anhydride, chloromaleic acid, bromomaleic acid, fumaric acid, citraconic acid, citraconic anhydride, mesaconic acid, itaconic acid, itaconic anhydride, ethyl maleic acid, ethyl maleic anhydride, methyl ethyl maleic acid, xeronic acid, glutaconic acid, glutaconic anhydride, α-methyl glutaconic acid, β-methyl glutaconic acid, α,α-dimethyl glutaconic acid, α,α-dimethyl glutaconic anhydride, muconic acid, and the like, and mixtures thereof in any proportion.

The other essential reactant in the formation of the essentially linear unsaturated polyesters of this invention is a dihydroxy compound selected from the group consisting of dihydroxy alcohols, dihydroxy phenols, and hydroxyalkylated derivatives of dihydroxy phenols. Any saturated aliphatic dihydroxy alcohol is suitable for the purposes of this invention, such as for example, ethylene glycol, diethylene glycol, propylene glycol, dipropylene glycol, trimethylene glycol, tetramethylene glycol, and higher alkanediols as exemplified by butanediol-1,2, butanediol-1,3, butanediol-1,4, pentanediol-1,2, pentanediol-1,4, pentanediol-1,5 hexanediol-1,6, octanediol-1,8, and the like, and mixtures thereof in any proportion. Any dihydroxy phenol is suitable for the purposes of this invention, and include phenols in which the phenolic hydroxyls are on the same or different benzene nuclei, as for example, catechol, resorcinol, hydroquinone, 2,4-dihydroxytoluene, 3,5-dihydroxytoluene, and the like; biphenol, 2,2'-dimethyl-biphenol, 3,3'-dimethyl-biphenol, and the like; bisphenols, such as for example, bis(3,5-dimethyl-2-hydroxyphenyl)methane, bis(3 - tert. - butyl-5-methyl-2-hydroxyphenyl)methane, 1,2-bis(3,5-dimethyl-2 - hydroxyphenyl)ethane, 2,2-bis(4-hydroxyphenyl)propane, 2,2-bis(3-tert.-butyl-5-methyl-2-hydroxyphenyl)propane, 2,2-bis(2-methyl-4-hydroxy-5-tert.-butylphenyl)propane, 2,2-bis(4-hydroxyphenyl)butane, 3,3-bis(4-hydroxyphenyl)pentane, and the like; and hydroxyalkylated derivatives of bisphenols such as, for example, 2,2-bis(4-β-hydroxyethoxyphenyl)propane, 2,2 - bis(4-β-hydroxyethoxyethoxyphenyl)butane, 3,3 - bis(4-β-hydroxy-β-methylethoxyphenyl)pentane, and the like; and mixtures thereof in any proportion.

As indicated above, part of the acidic reactant in preparing the unsaturated polyester resins of this invention may, if desired, be a dicarboxylic acid free of nonbenzenoid unsaturation, such as for example, phthalic acid, phthalic anhydride, isophthalic acid, terephthalic acid, oxalic acid, oxalyl anhydride, malonic acid, succinic acid, succinic anhydride, methyl succinic acid, glutaric acid, sebacic acid, adipic acid, pimelic acid, suberic acid, azelaic acid, brassilic acid, thapsic acid, and the like, and mixtures thereof, in any proportion. It is desirable, however, to employ such dicarboxylic acid free of nonbenzenoid unsaturation in minor amounts, less than 50% of the total stoichiometric requirement of acidic reactant for preparation of the unsaturated polyester resins of this invention.

In preparing the unsaturated polyester resins of this invention, it is customary to employ an excess of the alcoholic or phenolic reactant, between about 10% and about 15%, above the stoichiometric quantity required for complete esterification of the total acidic reactant. The esterification should be conducted sufficiently to produce an unsaturated polyester resinous material having an acid number not greater than about 50, and preferably from about 30 to about 40 for most purposes.

The presence of a free-radical generating catalyst is usually necessary to initiate and promote curing of the unsaturated polyester resin with the novel triene cross-linking agents of this invention, and any of the well-known and conventional free-radical generating catalysts are suitable for the purposes of this invention. Typical of such free-radical generating catalysts are the well-known peroxide class of catalysts and the well-known azo class of catalysts. Conventional redox catalyst systems are also free-radical generating catalysts suitable for the purposes of this invention. These redox systems have the advantage that they are useful at room temperature, whereas a peroxide catalyst alone, or an azo catalyst alone, generally require an elevated temperature on the order of 140° F. or higher to obtain useful polymerization rates. Typical redox catalyst systems usually consist of a peroxide or hydroperoxide such as potassium persulfate, benzoyl peroxide, acetyl peroxide, cumene hydroperoxide, or the like; a reducing agent such as hydrazine, hydroxylamine, thiols, sodium formaldehyde sulfoxylate, various amines such as diethylenediamine, triethylenetetramine, tertiary amines or the like; and a metal salt or complex such as soluble metal salts of lead, iron, cobalt, nickel, manganese, copper, zinc, cerium, and the like.

A few examples of the many suitable organic peroxide catalysts are benzoyl peroxide, succinyl peroxide, acetyl peroxide, methyl ethyl ketone peroxide, ditertiary butyl peroxide, cumene hydroperoxide, dicumyl peroxide, tertiary butyl hydroperoxide, cyclohexanone peroxide, tertiary butyl perbenzoate, tertiary butyl peracetate, perbenzoic acid, peracetic acid, anisoyl peroxide, toluyl peroxide, p-bromobenzoyl peroxide, p-methane hydroperoxide, pinane hydroperoxide, diisopropylbenzene hydroperoxide, 1-cyclohexanol-1-hydroperoxide, furoyl peroxide, chloroacetyl peroxide, and the like. The catalyst may be either a single molecular species of organic peroxide, such as benzoyl peroxide, or a mixture of two or more different molecular species of organic peroxides in any desired proportions, such as mixtures of ditertiary butyl peroxide and teritiary butyl hydroperoxide, or mixtures of benzoyl peroxide and tertiary butyl perbenzoate, and the like.

A few examples of the many suitable azo class of free-radical generating catalysts are: $\alpha,\alpha'$-azobis($\alpha,\gamma$-dimethylvaleronitrile), $\alpha,\alpha'$-azobis(isobutyronitrile), diethyl $\alpha,\alpha'$-azobis(isobutyrate, dimethyl $\alpha,\alpha'$-azobis(isobutyrate, $\alpha,\alpha'$-azobis($\alpha$-ethylbutyronitrile), $\alpha,\alpha'$-azobis(cyclohexanecarbonitrile), $\alpha,\alpha'$-azobis($\alpha$-methylbutyronitrile), $\alpha,\alpha'$-azobis($\alpha$-methyleneanthonitrile), diethyl $\alpha,\alpha'$-azobis($\alpha,\gamma$-dimethylvalerate), dihexyl $\alpha,\alpha'$-azobis(isobutyrate), $\alpha,\alpha$-azobis(isobutyramide), $\alpha,\alpha'$-azobis($\alpha,\gamma$-dimethylvaleramide), $\alpha,\alpha'$- azobis($\alpha$-cyclopropylpropionate), $\alpha,\alpha'$-azodiisobutyrate, dimethyl $\alpha,\alpha'$-azodiisobutyrate, diethyl $\alpha,\alpha'$-azodiisobutyrate, dihexyl $\alpha,\alpha'$-azodiisobutyrate, $\alpha,\alpha'$-azodiisobutyramide, 1,1'-azodicyclohexanecarbonitrile, $\alpha,\alpha'$-azobis($\alpha$-cyclopropylpropionitrile), $\alpha,\alpha'$-azobis($\alpha$-phenylpropionitrile), $\alpha$-(carbamyl-azo)isobutyronitrile, $\alpha,\alpha'$-azobis($\alpha$-methyl, $\gamma$-carboxybutyronitrile), and the like, and mixtures thereof in any proportion. $\alpha,\alpha'$-azobis(isobutyronitrile) is a commercial product which is readily available.

The amount of the catalyst employed may vary over rather wide limits to give varying catalyzed stability. Thus, from about 0.1% to about 10%, based on the total weight of polymerizable resin composition, may be used. Preferably, however, from about 2% to about 5% by weight of the catalyst, based on the weight of the polymerizable resin composition, gives the desired results. A faster rate of cure usually results from increasing the catalyst content within the aforementioned limits.

The present invention contemplates the use of any of the conventional additives of the prior polyester resin art in the usual quantities in the novel polymerizable mixtures and polymerization products of the present invention. Such additives include, by way of example, colorants such as compatible dyes and pigments; fire-retardant agents including compounds containing chlorine and phophorus; fillers such as wood flour, wood fiber, clay, diatomaceous earths, glass wool, mica, calcium carbonate, magnesium silicate, and the like; mold lubricants; plasticizers; inhibitors, like hydroquinone, to stabilize the resin mixtures against premature gelation; etc. However, the presence or absence of such conventional additives is purely optional, and quite immaterial to the invention.

Polymerizable compositions in accordance with this invention can be prepared in any desired fashion. For example, the triene cross-linking agent and catalyst, with or without conventional additives, can be uniformly blended with the unsaturated polyester resin by mechanical mixing or agitating above the melting point of the polyester resin. This is a convenient method of preparation when the polymerizable composition is to be employed as a casting resin for preparation of cured molded articles. Alternatively, for certain purposes, such as use as a bonding resin in laminates, it may be more convenient to dissolve the unsaturated polyester resin, triene cross-linking agent, and catalyst in a low boiling organic solvent such as acetone, or methyl ethyl ketone, or a low boiling hydrocarbon solvent to prepare a coating or impregnating solution, and incorporating conventional additives, if desired, into such solution. After application of the resulting solution, the volatile solvent is readily removed by evaporation, prior to curing. Other methods of blending the unsaturated polyester resin, triene cross-linking agent, and catalyst, with or without conventional additives, will be apparent to those skilled in the art.

The cross-linking process for curing the polymerizable compositions of this invention may be accomplished over a wide range of temperatures, with or without added pressure in the atmosphere or in closed molds. Generally, however, temperatures between about room temperature and about 300° F. are employed, since this represents a practical range for the purposes of this invention. Similarly, the cross-linking process for curing the polymerizable compositions of this invention may be accomplished over a wide range of time, from about 5 minutes to 24 hours, or even longer. In general, the rate of the cross-linking reaction about doubles for each 10° F. rise in temperature. The rate also increases with increasing amount of initiating catalyst. The particular temperatures and times selected will ordinarily depend somewhat on the nature and amount of initiating catalyst employed, on the particular unsaturated polyester being cross-linked, and on whether the polymerizable composition is being cross-linked in bulk or thick sections, or in relatively thin layers, as in resin-bonded laminates, for example. As an illustration, a typical unsaturated polyester resin derived from the esterification of fumaric acid with the propylene oxide adduct of 2,2-bis(4-hydroxyphenyl)propane can be conveniently cross-linked in bulk employing 5% by weight of 1,2,4-trivinylcyclohexane and 2% benzoyl peroxide, based on the unsaturated polyester, at about 185° F. for 18 to 19 hours. On the other hand, cross-linking can be satisfactorily accomplished on laminates prepared from glass cloth impregnated with somewhat similar polymerizable compositions at about 300° F. in a matter of 10 or 15 minutes.

The novel cured resins of this invention possess the excellent and well-known qualities of cured polyester resins in general. The cross-linked products are typically infusible three-dimensional polymers which are insoluble in solvents which readily dissolve the uncross-linked unsaturated polyester resins. Moreover, the cross-linked products are generally hard and rigid with good dimensional stability, and possess high tensile strength and high flexural modulus properties, both at ordinary temperatures as well as at elevated temperatures. During their polymerization, no gases are evolved in the curing operation. Since water-white, transparent products are obtainable, they may be dyed or pigmented in a substantially unlimited variety of shades and hues. In view of their good physical properties, the new resinous compositions have broad utility in many fields including use as adhesives, bonding agents, impregnating agents, molding compositions, and laminating and casting resins.

The general nature of the invention having been set forth, the following examples illustrate some specific embodiments of the invention. It is to be understood, however, that the invention is in no way limited to the examples, since this invention may be carried out by the use of various modifications and changes within the scope of the invention as herein set forth and described. All parts in the following examples are by weight unless otherwise specified.

EXAMPLES 1–2

These examples demonstrate cross-linking of an unsaturated polyester resin in bulk with the triene cross-linking agents of this invention. In each example 10 parts of Atlac 382, an unsaturated polyester of fumaric acid and the propylene oxide adduct of 2,2-bis(4-hydroxyphenyl) propane, namely, 2,2-bis(4-β-hydroxy-β-methylethoxyphenyl)propane, were melted in an open tube, and 2 parts of triene cross-linking agent were then added and thoroughly mixed with the melted resin, whereupon 0.4 part of tert-butyl perbenzoate catalyst was then added and mixed into the molten mixture of unsaturated polyester and cross-linking agent. The resulting mixture was then heated to about 284° F. and cured at this temperature for 22 hours. During the curing cycle in each example the unsaturated polyester resin gelled by cross-linking with the triene cross-linking agent to form a three-dimensional hard clear resin mass which was infusible, and insoluble in solvents which readily dissolved the original uncross-linked unsaturated polyester. Table 1 following shows the formulation of the polymerizable composition for each example, together with the properties of the cured resin mass.

Table 1

| Composition | Example 1 | Example 2 |
|---|---|---|
| Unsaturated Polyester (Atlac 382) | 10 | 10. |
| 1,5,9-cyclododecatriene | 2 | |
| 1,2,4-trivinylcyclohexane | | 2. |
| Tert-butyl perbenzoate | .04 | 0.4. |
| Properties of Cross-Linked Product | Infusible, clear, hard mass. | Infusible, clear, hard mass. |
| Solubility in benzene | Insoluble | Insoluble. |
| Solubility in methylene chloride | do | Do. |

EXAMPLES 3–8

These examples illustrate the application of cross-linked polymerizable compositions in accordance with this invention as the bonding agent in the preparation of glass cloth laminates. For each example a solution containing 70% by weight of Atlac 382, an unsaturated polyester of fumaric acid and the propylene oxide adduct of 2,2-bis(4-hydroxyphenyl)propane, namely 2,2-bis(4-β-hydroxy-β-methyl-ethoxyphenyl)propane, and 30% by weight of methyl ethyl ketone was prepared, and to this solution cross-linking agent and catalyst were added and mixed therewith to form a homogeneous fluid composition. The catalyst employed in all compositions was tert-butyl perbenzoate in an amount equal to 3% by weight of the combined weight of unsaturated polyester resin and cross-linking agent. Then 6 x 6 inch glass cloth squares were impregnated with the above fluid composition by immersion therein, whereupon they were withdrawn and dried for ½ hour at about 130° F. For each example, fourteen plies of the thus impregnated and dried glass cloth squares were stacked together and were laminated by molding in a hydraulic press at 300° F., initially applying only contact pressure for two minutes, and then completing the molding cycle with application of 60 pounds per square inch pressure to cross-link the bonding resin and simultaneously form a rigid laminate. A Barcol hardness measurement was made on each laminate thus produced, after which each laminate was cut into test strips on which tensile strength and flexural modulus measurements were made at 100° C. Table 2 following shows the amount of unsaturated polyester, the amount and kind of cross-linking agent, the duration of the curing and molding cycle at 300° F. after application of 60 pounds per square inch pressure, Barcol hardness, and tensile strength and flexural modulus at 100° C. for each example.

Table 2

| | Ex. 3 | Ex. 4 | Ex. 5 | Ex. 6 | Ex. 7 | Ex. 8 |
|---|---|---|---|---|---|---|
| Unsaturated Polyester (Atlac 382) | 88 | 86 | 86 | 92 | 88 | 86 |
| 1,2,4-trivinylcyclohexane | 12 | 14 | 14 | | | |
| 1,5,9-cyclododecatriene | | | | 8 | 12 | 14 |
| Curing and Molding Cycle at 300° F. After Application of 60 p.s.i. Pressure: Time, minutes | 10 | 10 | 20 | 10 | 10 | 20 |
| Barcol Hardness | 45 | 58.5 | 57.2 | 55.2 | 41.6 | 55.5 |
| Tensile Strength, p.s.i.×10³ at 100° C | 20.6 | 26.4 | 30.7 | 20.8 | 24.8 | 35.5 |
| Flexural Modulus, p.s.i.×10³ at 100° C | 72 | 182 | 113 | (¹) | 150 | 227 |

¹ Not measured.

EXAMPLES 9–28

These examples further illustrate the application of cross-linked polymerizable compositions in accordance with this invention as the bonding agent in the preparation of glass cloth laminates. Substantially the same procedure described for Examples 3–8 was followed in carrying out these examples, except that several different catalyst in different amounts were employed in these examples.

A Barcol hardness measurement was made on each laminate, after which each laminate was cut into test strips on which flexural modulus measurements were made at 22° C. and also at 100° C. Table 3 following shows the amount of unsaturated polyester, the amount and kind of cross-linking agent, the amount and kind of catalyst, the duration of the curing and molding cycle at 300° F. after application of 60 pounds per square inch pressure, Barcol hardness, and flexural modulus at 22° C. and at 100° C. for each example.

Table 4

|  | Ex. 29 | Ex. 30 | Ex. 31 |
|---|---|---|---|
| Unsaturated Polyester (Atlac 382E) | 83 | 83 | 83.4 |
| 1,5,9-cyclododecatriene | 14 | 14 | 14 |
| Tert-butyl perbenzoate | 3 | 3 |  |
| Di-tert-butyl peroxide |  |  | 0.7 |
| Tert-butyl hydroperoxide |  |  | 1.5 |
| Curing and Molding Cycle at 300° F. After Application of 100 p.s.i. Pressure: Time, minutes | 5 | 20 | 20 |
| Barcol Hardness | 52 | 66 | 67 |
| Flexural Modulus, p.s.i. ×10³ at 23° C | 25.8 | 36.6 | 43.8 |
| Flexural Modulus, p.s.i. ×10³ at 100° C | 6.1 | 20.0 | 5.6 |

Table 3

|  | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| Unsaturated Polyester (Atlac 382) | 84.7 | 84.7 | 84.7 | 84.7 | 85.4 | 84.9 | 84.9 | 86.0 | 85.8 | 84.3 |
| 1,5,9-cyclododecatriene | 12.6 | 12.6 | 12.6 | 12.6 | 12.2 | 12.2 | 12.2 | 12.2 | 12.2 | 12.2 |
| Tert-butylperbenzoate | 2.7 | 2.7 | 2.7 | 2.7 |  | 1.3 | 1.3 |  |  | 3.5 |
| Di-tert-butyl peroxide |  |  |  |  | 0.6 |  |  |  | 2.0 |  |
| Tert-butyl hydroperoxide |  |  |  |  | 1.8 |  |  |  |  |  |
| Benzoyl peroxide |  |  |  |  |  | 1.6 | 1.6 |  |  |  |
| Tert-butyl peracetate |  |  |  |  |  |  |  | 1.8 |  |  |
| Curing and Molding Cycle at 300° F. After App'n. of 60 p.s.i. pressure: Time, Min | 5 | 10 | 15 | 20 | 20 | 20 | 10 | 10 | 10 | 10 |
| Barcol Hardness | 43 | 38 | 57 | 55 | 54 | 54 | 54 | 68 | 32 | 57 |
| Flexural Modulus, p.s.i. ×10³ at 22° C | 34.4 | 37.0 | 44.4 | 28.4 | 44.6 | 43.1 | 42.0 | 41.8 | 32.8 | 45.6 |
| Flexural Modulus, p.s.i. ×10³ at 100° C | 15.7 | 17.0 | 24.2 | 19.3 | 5.3 | 18.3 | 15.2 | 11.0 | 2.3 | 20.3 |

|  | Ex. 19 | Ex. 20 | Ex. 21 | Ex. 22 | Ex. 23 | Ex. 24 | Ex. 25 | Ex. 26 | Ex. 27 | Ex. 28 |
|---|---|---|---|---|---|---|---|---|---|---|
| Unsaturated Polyester (Atlac 382) | 83.4 | 86.1 | 84.2 | 86.0 | 86.0 | 86.3 | 85.8 | 86.8 | 86.6 | 85.1 |
| 1,5,9-cyclododecatriene | 12.2 | 11.3 | 13.2 |  |  |  |  |  |  |  |
| 1,2,4-trivinylcyclohexane |  |  |  | 11.5 | 11.5 | 11.5 | 11.5 | 11.5 | 11.5 | 12.4 |
| Tert-butylperbenzoate | 4.4 | 2.6 | 2.6 | 2.5 | 2.5 |  | 1.2 |  |  | 2.5 |
| Di-tert-butyl peroxide |  |  |  |  |  | 0.5 |  |  | 1.9 |  |
| Tert-butyl hydroperoxide |  |  |  |  |  | 1.7 |  |  |  |  |
| Benzoyl peroxide |  |  |  |  |  |  | 1.5 |  |  |  |
| Tert-butyl peracetate |  |  |  |  |  |  |  | 1.7 |  |  |
| Curing and Molding Cycle at 300° F. After App'n. of 60 p.s.i. pressure: Time, Min | 10 | 10 | 10 | 5 | 10 | 20 | 20 | 10 | 10 | 10 |
| Barcol Hardness | 49 | 60 | 57 | 54 | 52 | 56 | 56 | 54 | 42 | 61 |
| Flexural Modulus, p.s.i. ×10³ at 22° C | 28.7 | 36.4 | 37.2 | 48.4 | 46.8 | 56.0 | 43.8 | 49.0 | 23.9 | 45.7 |
| Flexural Modulus, p.s.i. ×10³ at 100° C | 18.0 | 17.7 | 15.5 | 5.4 | 12.3 | 4.9 | 8.9 | 6.4 | 2.0 | 12.3 |

EXAMPLES 29–31

These examples are similar to Examples 3–8 and 9–28, except that a different unsaturated polyester resin, namely, Atlac 382E, an unsaturated polyester resin of fumaric acid and the ethyleneoxide adduct of 2,2-bis(4-hydroxyphenyl)propane, namely, 2,2-bis(4 - β - hydroxyethoxyphenyl)propane was employed instead of Atlac 382, as in Examples 3–8 and 9–28. Substantially the same procedure described for Examples 9–28 was followed in carrying out these examples, except that the curing and molding cycle, following the initial contact pressure for 2 minutes, was completed with application of 100 pounds per square inch pressure to cross-link the bonding resin and simultaneously form a rigid laminate.

A Barcol hardness measurement was made on each laminate, after which each laminate was cut into test strips on which flexural modulus measurements were made at 23° C. and also at 100° C. Table 4 following shows the amount of unsaturated polyester, the amount and kind of cross-linking agent, the amount and kind of catalyst, the duration of the curing and molding cycle at 300° F. after application of 100 pounds per square inch pressure, Barcol hardness, and flexural modulus at 23° C. and at 100° C. for each example.

What I claim and desire to protect by Letters Patent is:

1. The process of cross-linking an unsaturated polyester which comprises reacting an essentially linear unsaturated polyester which is a resinous polycondensation reaction product of an α,β-unsaturated dicarboxylic acid and a diol, and having a plurality of polymerizable α,β-enal groups in each polyester molecule with a cross-linking agent selected from the group consisting of 1,5,9-cyclododecatriene, 1,2,4-trivinylcyclohexane, and mixtures thereof in the presence of a free-radical generating catalyst.

2. A process in accordance with claim 1 in which the cross-linking agent is 1,5,9-cyclododecatriene.

3. A process in accordance with claim 1 in which the cross-linking agent is 1,2,4-trivinylcyclohexane.

4. A process in accordance with claim 1 in which the cross-linking agent is a mixture of 1,5,9-cyclododecatriene and 1,2,4-trivinylcyclohexane.

5. A polymerizable composition comprising a uniform mixture of
(1) an essentially linear unsaturated polyester which is a resinous polycondensation reaction product of an α,β-unsaturated dicarboxylic acid and a diol, and having a plurality of polymerizable α,β-enal groups in each polyester molecule, (2) a cross-linking agent selected from the group consisting of 1,5,9-cyclododecatriene, 1,2,4-trivinylcyclohexane, and mixtures thereof, and (3) a free-radical generating catalyst.

6. A polymerizable composition in accordance with claim 5 in which the essentially linear unsaturated polyester is a resinous polycondensation reaction product of an α,β-ethylenically unsaturated dicarboxylic acid and a dihydroxy compound selected from the group consisting of dihydroxy alcohols, dihydroxy phenols, hydroxyalkylated derivatives of dihydroxyphenols, and mixtures thereof.

7. A polymerizable composition in accordance with claim 5 in which the cross-linking agent is 1,5,9-cyclododecatriene.

8. A polymerizable composition in accordance with claim 5 in which the cross-linking agent is 1,2,4-trivinylcyclohexane.

9. A polymerizable composition in accordance with claim 5 in which the cross-linking agent is a mixture of 1,5,9-cyclododecatriene and 1,2,4-trivinylcyclohexane.

10. A polymerizable composition comprising a uniform mixture of
(1) an essentially linear unsaturated polyester which is a resinous polycondensation reaction product of fumaric acid and the propylene oxide adduct of 2,2-bis(4-hydroxyphenyl)propane,
(2) from about 5% to about 50% by weight of said unsaturated polyester of 1,5,9-cyclododecatriene and
(3) from about 0.1% to about 10% by weight of said polymerizable composition of an organic peroxide catalyst.

11. A polymerizable composition comprising a uniform mixture of
(1) an essentially linear unsaturated polyester which is a resinous polycondensation reaction product of fumaric acid and the propylene oxide adduct of 2,2-bis(4-hydroxyphenyl)propane,
(2) from about 5% to about 50% by weight of said unsaturated polyester of 1,2,4-trivinylcyclohexane, and
(3) from about 0.1% to about 10% by weight of said polymerizable composition of an organic peroxide catalyst.

12. A polymerizable composition comprising a uniform mixture of
(1) an essentially linear unsaturated polyester which is a resinous polycondensation reaction product of fumaric acid and the ethylene oxide adduct of 2,2-bis(4-hydroxyphenyl)propane,
(2) from about 5% to about 50% by weight of said unsaturated polyester of 1,5,9-cyclododecatriene, and
(3) from about 0.1% to about 10% by weight of said polymerizable composition of an organic peroxide catalyst.

13. A polymerizable composition comprising a uniform mixture of
(1) an essentially linear unsaturated polyester which is a resinous polycondensation reaction product of fumaric acid and the ethylene oxide adduct of 2,2-bis(4-hydroxyphenyl)propane,
(2) from about 5% to about 50% by weight of said unsaturated polyester of 1,2,4-trivinylcyclohexane, and
(3) from about 0.1% to about 10% by weight of said polymerizable composition of an organic peroxide catalyst.

14. A cross-linked polymer which is a reaction product of a cross-linking agent selected from the group consisting of 1,5,9-cyclododecatriene, 1,2,4-trivinylcyclohexane and mixtures thereof with an essentially linear unsaturated polyester which is a resinous polycondensation reaction product of an α,β-unsaturated dicarboxylic acid and a diol, and having a plurality of polymerizable α,β-enal groups in each polyester molecule.

15. A cross-linked polymer in accordance with claim 14 in which the cross-linking agent is 1,5,9-cyclododecatriene.

16. A cross-linked polymer in accordance with claim 14 in which the cross-linking agent is 1,2,4-trivinylcyclohexane.

17. A cross-linked polymer which is a reaction product of 1,5,9-cyclododecatriene with an essentially linear unsaturated polyester resinous polycondensation reaction product of fumaric acid and the propylene oxide adduct of 2,2-bis(4-hydroxyphenyl)propane.

18. A cross-linked polymer which is a reaction product of 1,2,4-trivinylcyclohexane with an essentially linear unsaturated polyester resinous polycondensation reaction product of fumaric acid and the propylene oxide adduct of 2,2-bis(4-hydroxyphenyl)propane.

19. A cross-linked polymer which is a reaction product of 1,5,9-cyclododecatriene with an essentially linear unsaturated polyester resinous polycondensation reaction product of fumaric acid and the ethylene oxide adduct of 2,2-bis(4-hydroxyphenyl)propane.

20. A cross-linked polymer which is a reaction product of 1,2,4-trivinylcyclohexane with an essentially linear unsaturated polyester resinous polycondensation reaction product of fumaric acid and the ethylene oxide adduct of 2,2-bis(4-hydroxyphenyl) propane.

References Cited by the Examiner

UNITED STATES PATENTS 3,065,199  10/1962  Collardean et al. _____ 260—861

FOREIGN PATENTS 1,144,920  3/1963  Germany.
848,637  9/1960  Great Britain.

OTHER REFERENCES

Niles, Earl T.: Reactions of Cyclododecatriene, Univ. Microfilm, L. C. Card No. MIC 60–1673, Dissertation Abstracts 20, 4526 (1960).

MURRAY TILLMAN, *Primary Examiner.*

J. T. GOOLKASIAN, *Assistant Examiner.*

UNITED STATES PATENT OFFICE
CERTIFICATE OF CORRECTION

Patent No. 3,227,780            January 4, 1966

Karl Brack

It is hereby certified that error appears in the above numbered patent requiring correction and that the said Letters Patent should read as corrected below.

Column 3, lines 19 and 20, for "2,2-bis(4-β-hydroxyethoxyethoxyphenyl)butane" read -- 2,2-bis(4-β-hydroxyethoxyphenyl)butane --; column 4, line 2, for "p-methane" read -- p-menthane --; column 6, Table 1, second column, line 4 thereof, for ".04" read -- 0.4 --.

Signed and sealed this 3rd day of January 1967.

(SEAL)

Attest:

ERNEST W. SWIDER
Attesting Officer

EDWARD J. BRENNER
Commissioner of Patents